United States Patent [19]
Hayes, Jr. et al.

[11] 3,876,237
[45] Apr. 8, 1975

[54] LOCKING DEVICE

[76] Inventors: George Wilson Hayes, Jr., 609 36th St., Manhatten Beach, Calif. 90266; Gerald Alan Wolf, 7307 Dunfield, Los Angeles, Calif. 90045

[22] Filed: Aug. 13, 1973

[21] Appl. No.: 388,118

[52] U.S. Cl. ........................ 292/202; 292/DIG. 60
[51] Int. Cl. ............................................. E05c 3/04
[58] Field of Search ...... 70/216, 217; 292/202, 204, 292/205, 207, 209, 210, DIG. 23, 341.17, DIG. 60

[56] References Cited
UNITED STATES PATENTS

| 1,339,721 | 5/1920 | Shaw | 70/216 |
| 1,858,088 | 5/1932 | Howard | 292/202 |
| 1,948,908 | 2/1934 | Evans | 292/202 |
| 3,690,708 | 9/1972 | Worley et al. | 292/341.17 X |

*Primary Examiner*—Richard E. Moore
*Attorney, Agent, or Firm*—Robert Louis Finkel

[57] ABSTRACT

A device which will releasably secure a closure to an opening in a walled structure with the opening adjacent to one of the walls thereof. The device is comprised of a rotatable crank journaled through the wall adjacent to the opening. A handle is attached to the portion of the crank extending externally of the structure for the purpose of rotating the crank, and receiving means are affixed to the inner surface of the closure for the purpose of releasably engaging the portion of the crank extending within the structure.

5 Claims, 4 Drawing Figures

PATENTED APR 8 1975  3,876,237

LOCKING DEVICE

FIELD OF INVENTION

This invention relates to devices used to secure closures, such as hatch covers, to walled structures, such as cargo lockers. More particularly it relates to means for releasably securing a cover over an opening in the roof of a cargo carrier for automotive vehicles or the like.

One object of the invention is to provide securing means of the type which may be operated by simple rotational motion of a handle. Another object is to provide such means in which the handle is located on the outside of one of the walls of the structure, rather than on the closure itself. Yet another object is to provide releasable securing means which permit varying degrees of force to be applied to the closure. Yet a further object of the invention is to provide releasable securing means which can be protected against unauthorized use by means of a lock formed integrally with the crank handle itself.

PRIOR ART

The prior art contains a variety of devices used for releasably securing closures. Many of these devices utilize rotational motion for their operation, others permit varying degrees of force to be applied to seat the closure over the opening in a walled structure, still others are adapted for mounting on the wall, rather than the closure, thereby leaving the closure free of external protrusions, and still others are provided self-contained locking means. So far known to us, however, no prior art device incorporates all of these features as does the subject invention.

BRIEF SUMMARY OF THE INVENTION

Although the subject invention may be utilized to secure closures for a variety of structures, it is primarily intended for use in connection with cargo storage boxes to be mounted atop vehicles such as automobiles, trailers, campers or the like. Accordingly it will be described in this context. Its other applications will become obvious from a reading of this description.

Typically a storage container of the type described consists of a box having a floor, four generally upright walls and a top containing an opening through which cargo may be loaded and unloaded. A hinged cover is adapted to fit over the opening. One edge of the opening is generally adjacent to one of the walls of the container. Essentially the subject invention comprises a crank journaled through the wall adjacent the opening. A handle is attached to the crank which extends outwardly of the wall and serves to facilitate rotation of the crank. A receiver is attached to the underside of the closure at a point adjacent the wall and is adapted to receive and releasably retain the end of the crank which extends inwardly of the wall. This end of the crank may be specially adapted to cooperate with the receiver to facilitate its engagement and release.

Preferably means are provided for increasing or decreasing the tensile force exerted inwardly of the closure against the receiver by the internal latching arm of the crank whereby the tightness of the seating of the closure over the opening may be adjusted. Likewise, in the preferred embodyment, a resilient seal is provided around the edge of the opening or around the periphery of the closure to make the cargo compartment weather-tight.

A key-operated tumbler lock may be provided in the handle to permit the closure to be secured against unauthorized entry when the crank locking arm is engaged by the receiver.

The structure and operation of the subject invention will be more clearly understood from the reading of the following description, taken in connection with the appended drawings in which.

DETAILED DESCRIPTION

Figure 1:
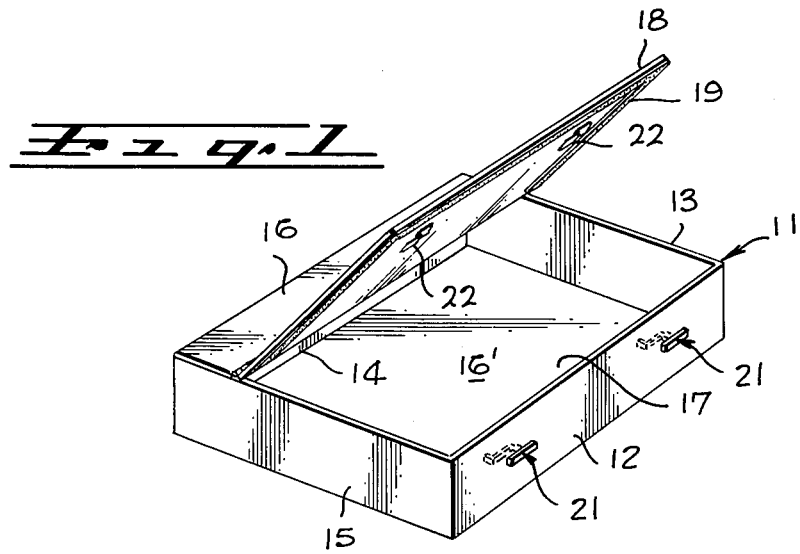
FIG. 1 is a perspective view of a walled storage container adapted for mounting on a vehicle or the like, with the crank of the subject invention journaled through one of its walls.
Figure 2:
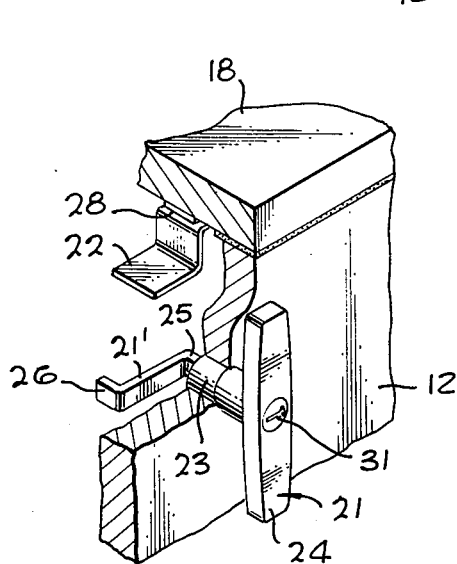
FIG. 2 is an enlarged fragmentary perspective view of the container of FIG. 1 with portions of the wall, top and closure cut away to show the locking arm of the crank in its fully released position.
Figure 3:
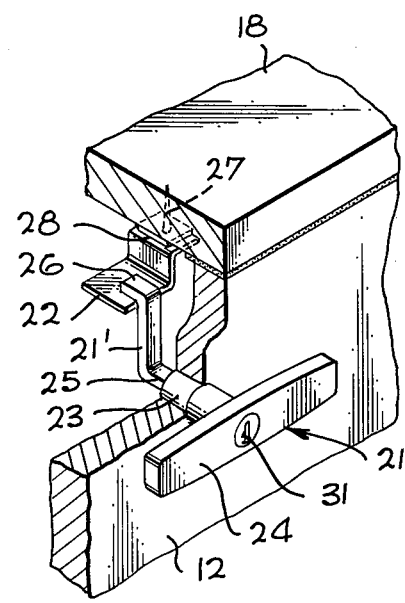
FIG. 3 is an enlarged fragmentary perspective view of the mechanisms shown in FIG. 2 with the crank fully engaged by the receiver.
Figure 4:
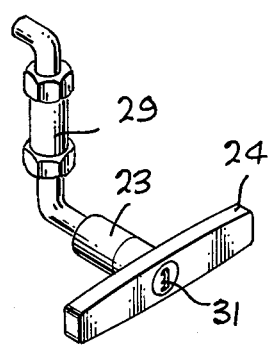
FIG. 4 is an enlarged perspective view of the mechanism shown in FIGS. 2 and 3 illustrating a turnbuckle assembly by means of which the length of the crank locking arm may be varied.

FIG. 1 illustrates a storage container 11 adapted for mounting on top of an automobile, camper or trailer. The container 11 includes four upright walls 12, 13, 14 and 15, a top 16, and a bottom 16. An opening 17 is provided in the top for access into the container. A closure 18 is mounted by means of hinges along one of its edges to fit over the opening when it is in its closed position. A seal or weather stripping 19 is provided around the periphery of the closure 18.

The closure securing device of the subject invention comprises a crank assembly 21, which is mounted in the wall 12 adjacent the opening 17, and a receiver assembly 22 which is mounted on the inside surface of the closure adjacent the wall 12.

The crank assembly 21 consists of a crank 21', a journal housing 23 and a handle 24. The crank 21' is a metal rod with two 90 degree bends, formed to allow one of the arms 25 to be journaled through the housing 23 and attached to a handle 24, and the other arm 26, parallel to the journaled arm 25, to releasably engage the receiver 22 when the crank is rotated by means of the handle 24.

When the locking arm 26 engages the receiver 22, the closure 18 is secured to the stationary wall 12. Conversely, when the locking arm 26 is not engaged by the receiver 22, the closure may be lifted or otherwise removed from the opening in the walled structure.

The receiver 22 is mounted on the internal surface of the closure 18 by suitable means such as screws, bolts 27, or adhesives. It is a significant feature of the invention that with this construction there are no components external to the exposed outer surface of the closure.

The tightness of the seal between the closure 18 and the walled structure 12 may be controlled by designing the receiver 22 to be engaged by the locking arm 26 with a predetermined force.

Several means of adjusting the tensile force between the closure 18 and the walled structure 12 are available. One such means is the use of shims 28 between the receiver 22 and the closure 18. Another such means is the provision of a turn buckle and lock nut assembly 29 on the radially extending portion of the crank 21.

The handle 24 is equipped with a tumbler lock 31 which may be locked with a key to secure the handle to the journal housing 23 thereby preventing its rotation.

With the foregoing description in mind, what we claim as our invention is:

1. In a container having a plurality of sides, a first one of said sides containing an opening therein adjacent to a second one of said sides and a closure hinged to said first side and adapted to fit over said opening, means for releasably securing the closure to the opening, comprising:

a crank journalled through a journal housing in a side adjacent to the side containing said opening, adapted for rotation therein, and having the end of the portion of said crank extending inwardly of said container aligned substantially parallel with the axis of rotation of the portion of the crank which is journalled through said side;

handle means affixed to the portion of said crank extending outwardly of said side and adapted to rotate said crank;

receiving means affixed to the inner surface of said closure and adapted to releasably receive the end of the portion of said crank extending inwardly of said container; and adjustment means in the radially extending portion of said crank within said container to vary the length of said portion of said crank, whereby the tensile force applied to said closure may be varied selectively.

2. The device defined by claim 1, wherein the radially extending portion of said crank within said container is formed in two parts, each threaded at its end and joined by a collar threaded internally at its ends to receive the ends of said parts.

3. The device defined by claim 2, whereby securing or releasing of the closure is accomplished by rotational motion of the handle.

4. The device defined by claim 3, including a locking means secured to said handle and adapted to releasably engage said journal housing to prevent rotation of said handle.

5. The device defined by claim 1, wherein:

said receiving means comprises a generally Z shaped flange of resilient material mounted on the underside of the closure; and tension adjusting means are included selectively varying the spacing between the end of the base member of said Z shaped flange and the underside of said closure.

* * * * *